Aug. 12, 1941.   V. J. KELLER   2,252,512
INTERNAL COMBUSTION MOTOR
Filed Sept. 28, 1940   4 Sheets-Sheet 1

Inventor
Vincent Joseph Keller

By Clarence A. O'Brien

Attorney

Aug. 12, 1941.   V. J. KELLER   2,252,512
INTERNAL COMBUSTION MOTOR
Filed Sept. 28, 1940   4 Sheets-Sheet 4

Inventor
Vincent Joseph Keller

By Clarence A. O'Brien

Attorney

Patented Aug. 12, 1941

2,252,512

UNITED STATES PATENT OFFICE 2,252,512

INTERNAL COMBUSTION MOTOR

Vincent Joseph Keller, Davenport, Iowa

Application September 28, 1940, Serial No. 358,914

1 Claim. (Cl. 123—59)

This invention relates to an internal combustion motor, the general object of the invention being to so construct and arrange the parts that the piston acts as valve means for controlling the inlet and exhaust ports and to provide an efficient and economical motor which is very effective for use on aircraft.

Another object of the invention is to provide a high speed impeller for forcing a combustible mixture into the cylinder, with means whereby the piston on its downward stroke will first uncover the exhaust port and then the inlet port so that the fluid forced into the cylinder through the inlet port will act to scavenge the remaining exhaust gases through the exhaust port.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which—

Figure 4 is a section on the line 4—4 of Figure 1.

Figure 1:
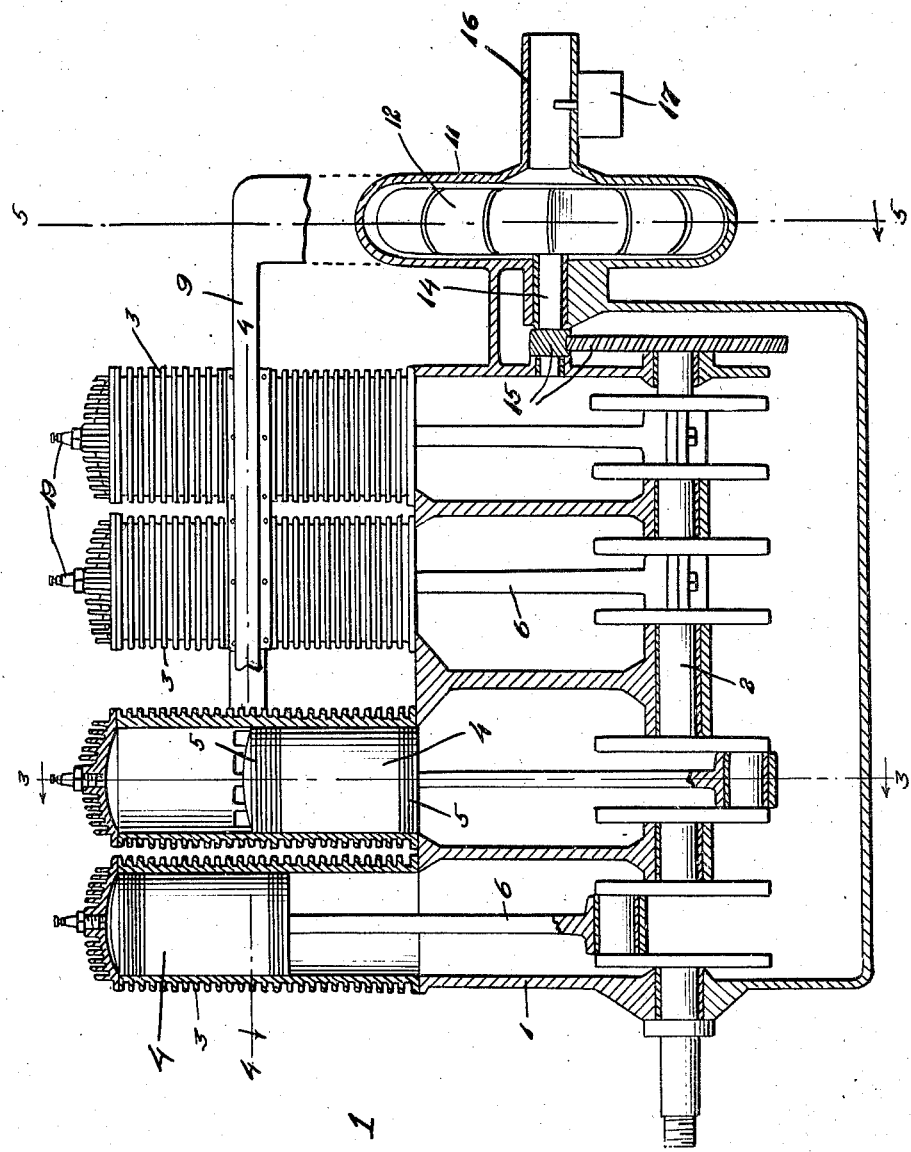
Figure 1 is a vertical sectional view through the improved engine taken longitudinally of the engine, this view showing two of the cylinders and a part of the inlet manifold in elevation.
Figure 2:
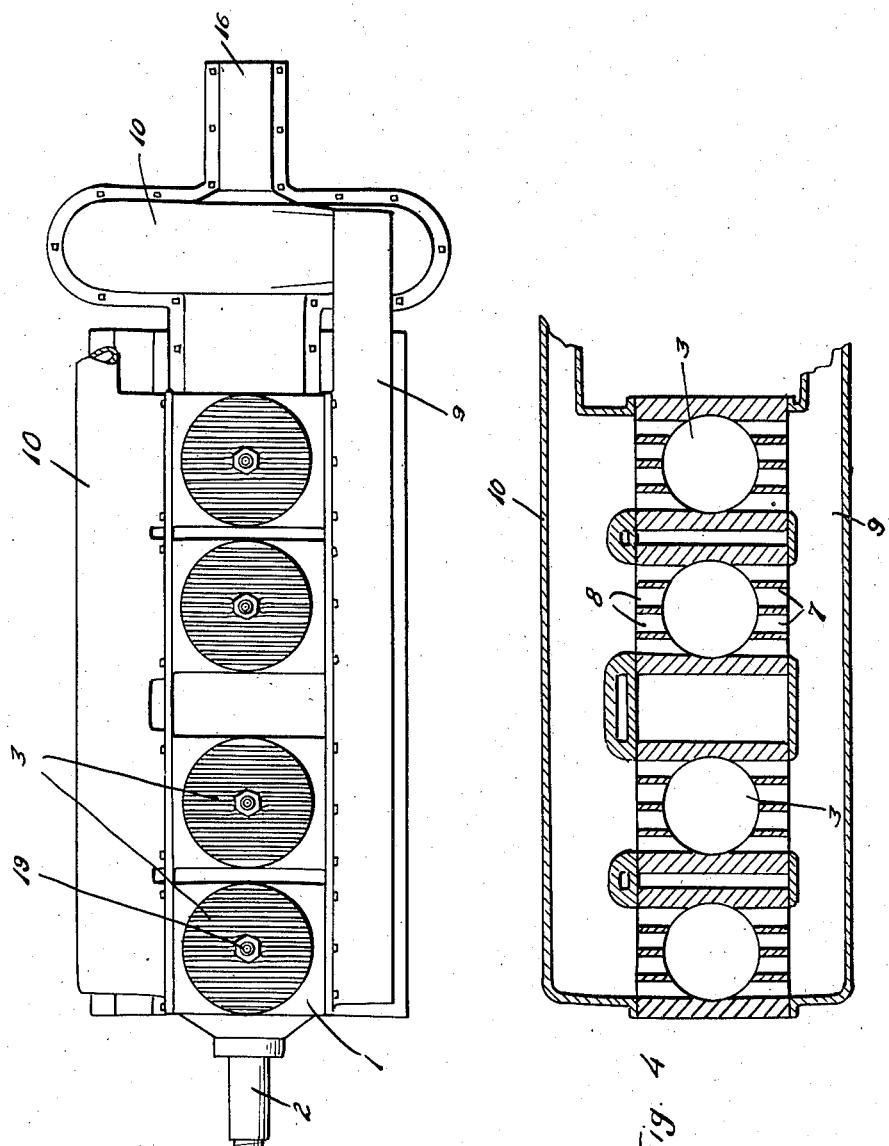
Figure 2 is a top plan view of the motor.
Figure 3:
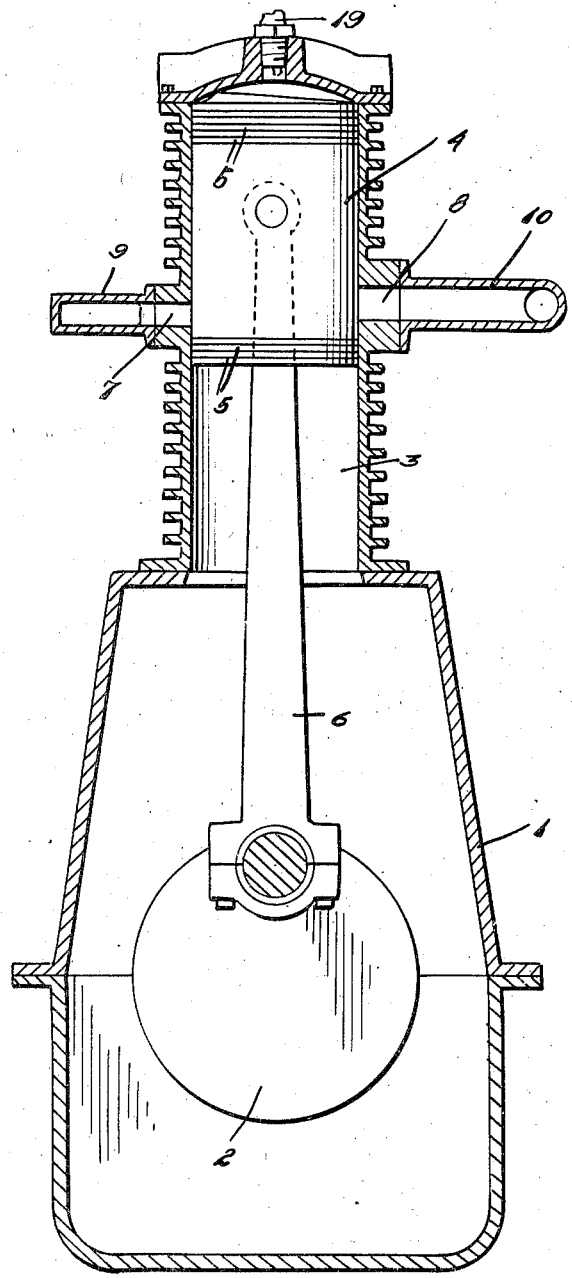
Figure 3 is a section on the line 3—3 of Figure 1.
Figure 5:
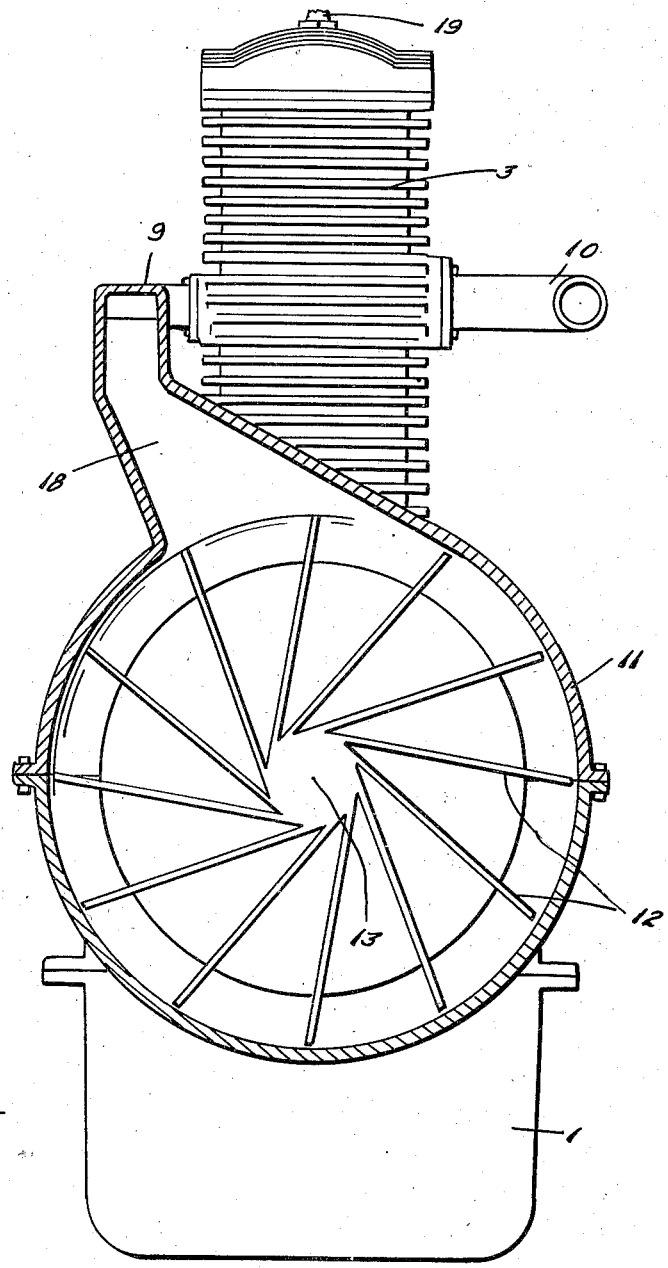
Figure 5 is a section on the line 5—5 of Figure 1.

In these views, the numeral 1 indicates the crankcase in which the crankshaft 2 is journaled and a plurality of cylinders 3 extend upwardly from the crankcase and each cylinder contains an elongated piston 4 which has rings 5 at its upper and lower ends. The pistons are connected with the cranks of the crankshaft by the connecting rods 6. Intermediate the end of each cylinder are the inlet ports 7 and the outlet ports 8, these ports 7 and 8 being located in opposite sides of the cylinder with the inlet ports 7 having their upper walls arranged below the plane of the upper walls of the outlet ports as shown in Figure 3. Also, the outlet ports are larger than the inlet ports. An inlet manifold 9 is in communication with the inlet ports and an exhaust manifold 10 receives the exhaust gases from the exhaust ports. A fan or impeller casing 11 is supported from one end of the motor and contains the fan or impeller 12 which is attached to the hub 13 on one end of a shaft 14 which extends into the crankcase and said shaft is driven from the crankshaft 2 by the worm gearing 15 and I prefer to arrange the gears in a 6 to 1 ratio so that the impeller or fan will be rotated at high speed so that the fuel is thoroughly mixed with the air. The casing 11 is provided with a centrally arranged air inlet member 16 with which the fuel nozzle 17 is in communication so that when the fan or impeller is rotated air and fuel will be drawn into the casing 11 to provide an explosive mixture and this mixture after being thoroughly mixed in the casing 11 by the fan 12 is driven with considerable pressure through the outlet 18 of the casing 11 into the inlet manifold 9.

As shown in Figure 3, when the piston nears the bottom of the stroke it will first uncover the exhaust port 8 so that the exhaust gases can flow from the upper portion of the cylinder through the port 8 into the exhaust manifold 10 and upon further downward movement of the piston it will uncover the inlet port 7 so that the mixture under pressure will pass from the casing 11 into the manifold and then through the port 7 into the cylinder above the piston. The first portion of the mixture will force out any exhaust gases which remain in the cylinder and then on the upward movement of the piston both sets of ports 7 and 8 are closed and the mixture is compressed in the top part of the cylinder and is exploded or ignited in any suitable manner, such as by means of an ignition system including a spark plug 19.

As will be seen the motor is a two-stroke one and it eliminates the mixing of the gas and oil together which is usually done with this type of motor.

While the drawings show the motor with the cylinders in a straight line, it will, of course, be understood that all types of motors can be constructed under this invention.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

In a motor of the class described, a crankcase, a crankshaft therein, cylinders connected with the case and having inlet and outlet ports in intermediate portions of their side parts with the exhaust ports arranged opposite the inlet ports and the exhaust port of each cylinder being of larger area than the inlet port of said cylinder and the bottom wall of said exhaust port being located above the plane of the bottom wall of the inlet port, an elongated piston in each cylinder having a plain upper end, free of projections, a connecting rod connecting each piston with the crankshaft, each piston having upper and lower rings and each piston closing the inlet and exhaust ports when in raised position and first uncovering the exhaust port and then the inlet port as the piston moves downwardly, a casing connected to an end of the crankcase and having an air inlet, a fuel delivery device extending into the air inlet, a fan in the casing, a shaft journaled in said end of the crankcase and in a part of the casing and connected with the fan, said shaft extending into the crankcase, a gear on the shaft located in the crankcase and a gear on the adjacent end of the crankshaft and meshing with the gear of the shaft for rotating the same at high speed and a manifold receiving the mixture from the fan casing and delivering the mixture to the inlet ports.

VINCENT JOSEPH KELLER.